(12) United States Patent
Pellegrino

(10) Patent No.: US 7,117,603 B1
(45) Date of Patent: Oct. 10, 2006

(54) MOUNTING SYSTEM FOR MOUNTING AN ALIGNMENT INSTRUMENT ON A VEHICULAR WHEEL THAT USES ANY KNOWN LUG BOLT PATTERN

(76) Inventor: Dean S. Pellegrino, 243 Lynn Oaks Ave., Thousand Oaks, CA (US) 91320

( * ) Notice: Subject to any disclaimer, the term of this patent is extended or adjusted under 35 U.S.C. 154(b) by 124 days.

(21) Appl. No.: 10/911,251

(22) Filed: Aug. 3, 2004

(51) Int. Cl.
G01B 5/255 (2006.01)
G01B 21/26 (2006.01)

(52) U.S. Cl. .................................. 33/213.18
(58) Field of Classification Search ............. 33/203.18, 33/203, 203.15, 203.16, 203.17, 203.19, 33/203.2, 288, 562, 563, 566; 356/139.09, 356/155
See application file for complete search history.

(56) References Cited

U.S. PATENT DOCUMENTS

| | | | |
|---|---|---|---|
| 2,882,607 A | 4/1959 | Binder | |
| 3,426,991 A | 2/1969 | Rishovd | |
| 4,115,926 A | 9/1978 | Hampton, Jr. | |
| 4,150,897 A | 4/1979 | Roberts, Jr. et al. | |
| 4,159,574 A | 7/1979 | Samuelsson et al. | |
| 4,167,817 A | 9/1979 | Hunter | |
| 4,176,463 A | 12/1979 | Ringle | |
| 4,377,038 A | 3/1983 | Ragan | |
| 4,432,145 A | 2/1984 | Caroff | |
| 4,534,115 A | 8/1985 | Kashubara | |
| 4,918,821 A | 4/1990 | Bjork | |
| 5,168,632 A | 12/1992 | Rimlinger, Jr. | |
| 5,174,032 A | 12/1992 | Beck | |
| 5,242,202 A | 9/1993 | Ettinger | |
| 5,339,508 A * | 8/1994 | Ventress ...................... | 29/273 |
| 5,369,602 A | 11/1994 | Naas et al. | |
| 5,446,967 A | 9/1995 | Gender | |
| 5,471,754 A * | 12/1995 | Mieling .................... | 33/203.18 |
| 5,488,471 A | 1/1996 | McClenahan et al. | |
| 5,625,953 A | 5/1997 | Healy et al. | |
| 5,815,257 A | 9/1998 | Haas | |
| 5,842,281 A * | 12/1998 | Mieling .................... | 33/203.18 |
| 5,987,761 A | 11/1999 | Ohnesorge | |
| 6,131,293 A | 10/2000 | Maioli et al. | |
| 6,138,366 A * | 10/2000 | Boess ...................... | 33/203.18 |
| 6,282,799 B1 | 9/2001 | Warkotsch | |

(Continued)

FOREIGN PATENT DOCUMENTS

EP          1167944 A2 *   1/2002

(Continued)

*Primary Examiner*—R. Alexander Smith
(74) *Attorney, Agent, or Firm*—Jack C. Munro

(57) ABSTRACT

A mounting system for mounting an alignment instrument onto a vehicular wheel which is to be used to align the wheel of the vehicle. The mounting system includes a mounting plate which has an engagement structure located directly adjacent the peripheral edge of the mounting plate. At least a pair of the lug nuts, and preferably three in number of the lug nuts, of the vehicular wheel are to be removed and replaced with elongated internally threaded sleeves, all the same length, which are substantially longer in length than the lug nuts so that the mounting plate will be mounted in a spaced relationship from the vehicular wheel. The mounting plate includes at least five in number of elongated holes generally radially disposed in a spaced apart arrangement relative to the center of the mounting plate. A fastener assembly is used to fixedly mount the mounting plate onto the elongated internally threaded sleeves. The alignment instrument is then to be clamped onto the mounting plate by engaging with the engagement structure.

2 Claims, 3 Drawing Sheets

U.S. PATENT DOCUMENTS

| | | |
|---|---|---|
| 6,313,911 B1 | 11/2001 | Stieff |
| 6,349,593 B1 * | 2/2002 | Blair .......................... 73/146 |
| 6,507,988 B1 | 1/2003 | Riviere |
| 6,622,389 B1 | 9/2003 | Pellegrino |
| 2003/0159298 A1 * | 8/2003 | Mieling .................. 33/203.15 |

FOREIGN PATENT DOCUMENTS

| | | | |
|---|---|---|---|
| EP | 1455161 A | * | 9/2004 |
| JP | 2000221115 A | * | 8/2000 |

* cited by examiner

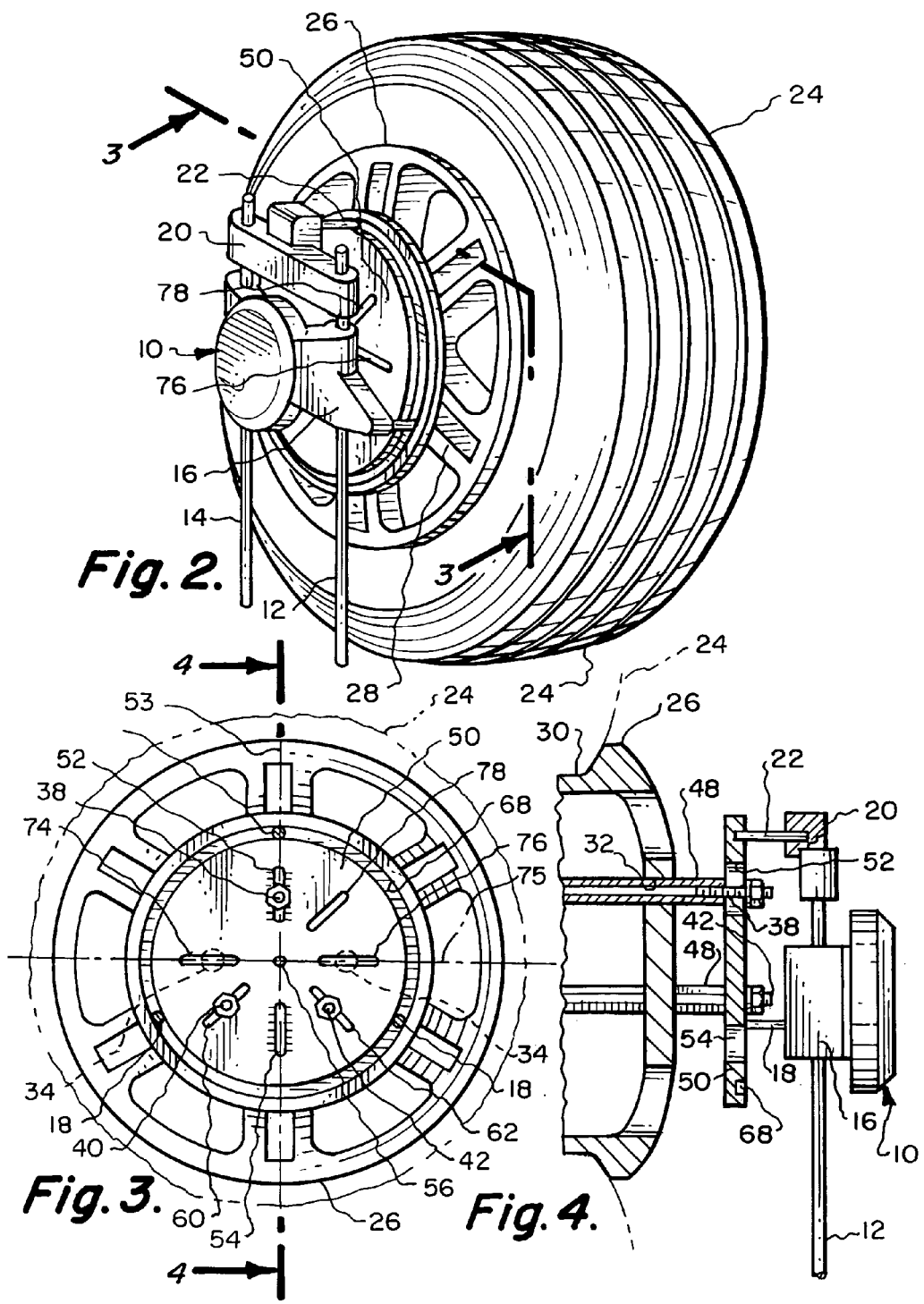

MOUNTING SYSTEM FOR MOUNTING AN ALIGNMENT INSTRUMENT ON A VEHICULAR WHEEL THAT USES ANY KNOWN LUG BOLT PATTERN

BACKGROUND OF THE INVENTION

1. Field of the Invention

The field of this invention relates to a system for mounting of an alignment instrument precisely on a vehicular wheel in order to align that wheel where the alignment instrument does not in and of itself touch the vehicular wheel and the mounting system can be utilized with any known lug bolt pattern on which the vehicle wheel is mounted.

2. Description of the Related Art

The subject matter of the present invention is deemed to be an improvement over U.S. Pat. No. 6,622,389 which is owned by the present inventor. Proper alignment of vehicle wheels is necessary for smooth vibration-free handling of the vehicle and also so the vehicle doesn't have a tendency to drift one way or another on the road. Also, proper alignment of vehicle wheels is a necessary component for even tire wear. To accomplish vehicular alignment, it is necessary to establish the position of certain measurements in conjunction with each vehicle wheel. These measurements are camber, caster, steering axis, inclination and toe.

Typical present day alignment instruments utilize placing a separate vehicular instrument (sensor) on each vehicular wheel. Each instrument has an emitter and a receiver. The emitter emits a signal which is transmitted to a receiver of another alignment instrument. The receiver will convert the signal into a value which is indicative of the corresponding alignment angle of the vehicle. This information can be used by the mechanic to adjust the aforementioned measurements in order to achieve the correct and necessary alignment for a vehicular wheel.

Alignment instruments that are in present day usage are normally mounted onto the entire rim of the vehicular wheel. Tire rims sometimes may be damaged and may be slightly out of round or slightly inclined relative to the wheel hub. Such damage frequently occurs by the tire and the rim coming into hard contact with an uneven roadway, such as a chuckhole or a curb. Using of the alignment instrument in conjunction with the tire rim does not achieve an accurate alignment because the rim itself is not correctly aligned relative to the wheel hub on which it is mounted.

Additionally, a great many tire rims are designed to be ornate and have a highly polished chrome surface. Mounting of an alignment instrument on such a vehicular rim frequently causes scratching or denting of the rim. Vehicle owners of such rims take great pride in the appearance of these rims. When a vehicle owner has left his vehicle with a mechanic or tire shop, and when he or she comes back to pick up his or her vehicle finds scratches or dents on the rims, almost invariably the vehicle owner will insist upon replacement, not repair, of these rims. Replacement of each rim can run several hundred dollars in cost to the mechanic or tire shop.

Additionally, most tire rims, in years past, have been manufactured with an annular raised lip located directly adjacent the peripheral edge of the tire rim. The alignment instruments have been constructed to utilize that annular raised lip to mount the instrument onto the tire rim. Currently, some tire rims no longer are being manufactured with this annular raised lip. Therefore, there is no known way to mount the alignment instrument onto the tire rim. The result is the mechanic doing the alignment just does a lot of "fudging" or "speculating" and guesses at what he or she hopes will be a correct alignment. The result is the alignment is of poor quality and properly handling of the vehicle is not obtained. Uneven tire wear is also obtained.

SUMMARY OF THE INVENTION

The basic embodiment of mounting system adapted to mount an alignment instrument on a vehicle wheel which is fixedly mounted on a wheel hub assembly by a series of spaced apart lug bolts that protrude outward from the wheel hub assembly. The mounting system includes a mounting plate with this mounting plate having a peripheral edge and an engagement means located directly adjacent the peripheral edge. A spacing means for fixedly mounting of the mounting plate is utilized in a spaced position from the vehicular wheel. A fastener assembly is secured to the spacing means. The fastener assembly securely mounts the mounting plate on the vehicular wheel. The mounting plate having at least five in number of elongated holes located in a specific spaced apart pattern arrangement. Each elongated hole is to be able to connect with a lug bolt with there being at least two in number of the lug bolts each connecting with a said elongated hole. The alignment instrument is adapted to be clamped onto the mounting plate by engaging with the engagement means.

A further embodiment of the present invention is where the basic embodiment is modified by the elongated holes having a longitudinal dimension which is longer in length than its transverse dimension and where two of these elongated holes are positioned so that their longitudinal dimensions are horizontal.

A further embodiment of the present invention is where the just previous embodiment is modified by having the longitudinal dimension of two of the elongated holes being located vertically.

A further embodiment of the present invention is where the just previous embodiment is modified by there being at least three holes having their longitudinal dimension being positioned angularly to both horizontal and vertical.

A further embodiment of the present invention is where the just previous embodiment is modified by there being an angularly positioned elongated hole located between a horizontally located hole and a vertically oriented elongated hole.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 2 is an isometric view showing the alignment instrument mounted on the mounting plate of the present invention which is also mounted in conjunction with the vehicular wheel;

FIG. 3 is a cross-sectional view taken between the alignment instrument and the mounting plate of the structure of the present invention showing more clearly how the mounting plate is mounted in conjunction with the vehicular wheel when there is a five in number of lug bolt pattern;

FIG. 4 is a transverse cross-sectional view through the vehicular wheel and mounting plate of the present invention taken along line 4—4 of FIG. 3;

DETAILED DESCRIPTION OF THE INVENTION

Figure 1:
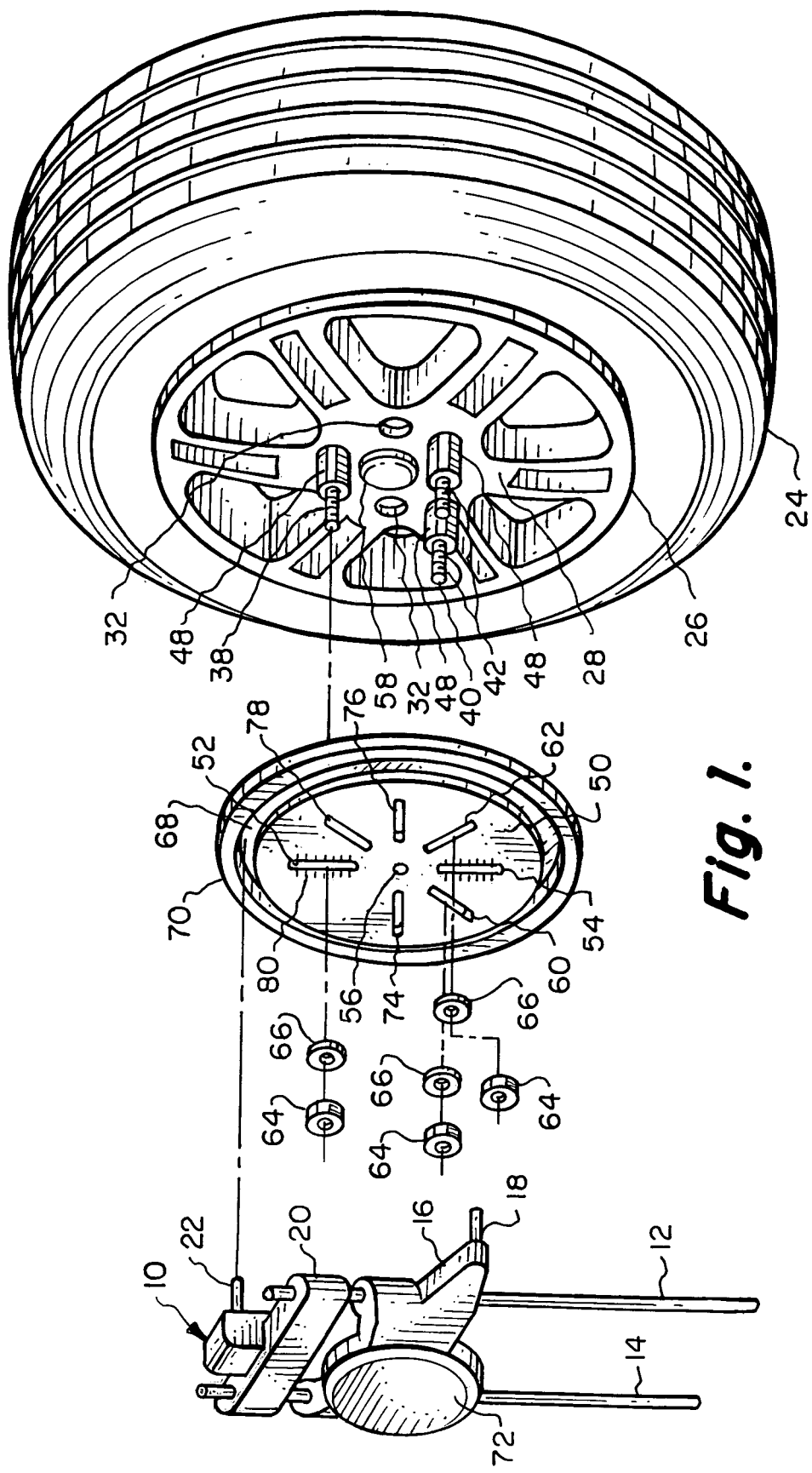
FIG. 1 is an exploded isometric view showing the vehicular wheel and an alignment instrument and the structure of the present invention being mounted in conjunction with the vehicular wheel which is then to be used for mounting of the alignment instrument.
Figure 5:
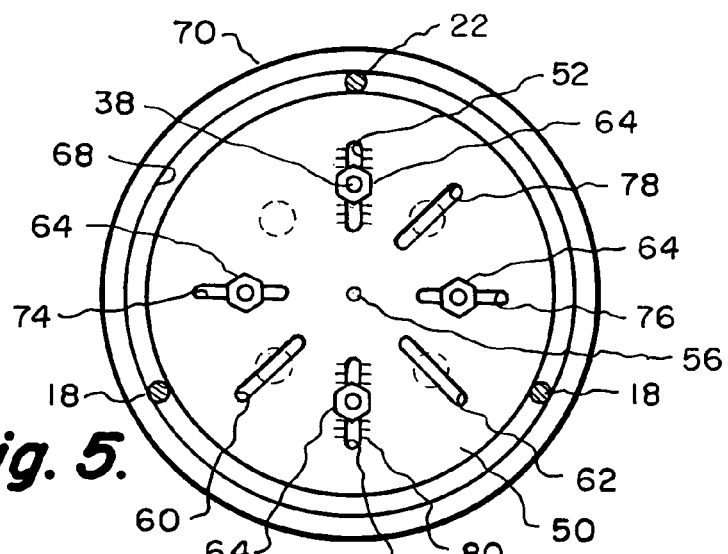
FIG. 5 is a view of the mounting plate incorporated within the mounting system of the present invention showing which lug bolts could be utilized in order to mount the mounting plate when there is a four in number of pattern of lug bolts or eight in number of pattern of lug bolts.

Referring particularly to the drawings, there is shown in FIGS. 1 and 2 a conventional alignment instrument which is generally referred to as an aligning sensing head 10. The specific construction of the sensing head 10 does not constitute any specific part of this invention but is deemed to be prior art. The sensing head 10 includes a housing 16. Housing 16 is slidably mounted on a pair of parallel spaced apart rods 12 and 14. The housing 16 has two in number of fingers 18 mounted thereon. Each of the fingers 18 comprise small protruding rods that are located parallel to each other. The housing 16 is slidably mounted on the rods 12 and 14. The rods 12 and 14 are fixedly secured to a crossbar 20. Mounted on the crossbar 20 and located equidistantly spaced from each of the rods 12 and 14 is another finger 22. The purpose of the fingers 18 and 22 will be explained further on in the specification.

Referring particularly to FIGS. 1 and 2, there is shown a vehicular tire 24 which is mounted on a tire rim 30 which is located between a front rim flange 26 and an aft rear flange, not shown. The rim flange 26 as well as the not shown rim flange are integrally constructed to a disc 28 which is commonly constructed into an ornate configuration. Mounted in conjunction with the disc 28 are a plurality of equiangularly spaced apart lug bolt holes 32. Each lug bolt hole 32 is to have mounted therein a lug bolt, which is not shown, which is utilized in a conventional manner to fixedly secure the disc 28 onto a wheel hub (not shown) for the vehicle. These lug bolts are precisely mounted relative to the wheel hub. The center point of these arranged lug bolts is identical to the center of the wheel hub. It is to be understood that in a typical vehicle there will be four such wheel hubs, two front and two rear. The present invention is only concerned with the two wheel hubs that are located at the front portion of the vehicle where the steering of the vehicle takes place. It is these wheel hubs that are necessary to be aligned according to camber, caster, steering axis inclination and toe in order for the tire 24 to wear evenly as it is being driven on the road.

Some wheel hubs have four in number of lug bolts while other have five in number, still others have six in numbers and still others have eight in number. In referring particularly to FIG. 3 of the present invention, there is depicted an arrangement where there are five in number of lug bolts with a left side lug bolt hole 32 being shown in phantom and a right side lug bolt hole 32 being shown in phantom. Lug bolts are being used to fixedly mount the tire 24, tire rim 30 and disc 28 onto the wheel hub. Three in number of the lug bolts are removed and are replaced with a spacer in the form of an internally threaded sleeve 48. It is to be understood that there are three in number of the sleeves 48 all the same length which is arbitrarily selected. Each sleeve 48 has a protruding threaded fastener defined as an upper lug bolt 38 and protruded fasteners of sleeves 48 defined as lower lug bolts 40 and 42. The result is that the three different sleeves 48 produce an outwardly spaced attachment area on which is to be located a mounting plate 50. The mounting plate 50 has a pair of vertically oriented elongated holes 52 and 54 which are formed in the plate 50 so that the longitudinal dimension of the holes 52 and 54 are in alignment with this longitudinal dimension passing through center point 56 of the mounting plate 50. The longitudinal dimension of holes 52 and 54 coincides with vertical axis 53. The center point 56 is to be precisely aligned with the center 58 of the disc 28.

Formed within the mounting plate 50 and angularly spaced about thirty-six degrees from elongated hole 54 is an elongated hole 60 on one side of the elongated hole 54 and on the opposite side of the elongated hole 54 is another elongated hole 62. The longitudinal dimension of the elongated holes 60 and 62 may be radial relative to the center point 56 or could be slightly positioned not quite radial. Actually, it has been discovered that it is best to locate the holes 60 and 62 slightly skewed from radial. Their longitudinal dimension intersect axis 53 spaced from center point 56 about five sixteenths of an inch in a direction toward elongated hole 54. This particular arrangement seems to work best for the greatest number of different lug bolt series as such are known to vary slightly. The length of the elongated holes 60 and 62 are generally the same which is also the same as the length of the holes 52 and 54. However, the length of the holes 52, 54, 60 and 62 could vary without departing from the scope of this invention. Lower lug bolt 40 connects with the elongated hole 60. Lower lug bolt hole 42 connects with the hole 62. Upper lug bolt 38 connects with the hole 52. An appropriate nut and washer 64 and 66 respectively is to be mounted on each of the lug bolts 38, 40 and 42 and appropriately tightened which will now fix the mounting plate 50 in a parallel position relative to the rotational plane through the vehicular tire 24. The result is a plane passing directly through the outer edge of the tire rim flange 26 will be located parallel to the plane of the mounting plate 50.

Figure 6:
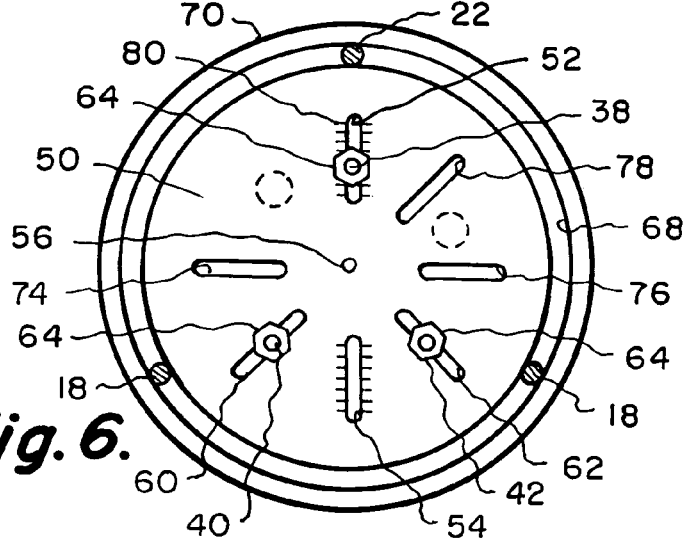
FIG. 6 is a view similar to FIG. 5 but showing which lug bolts are utilized when the lug bolt pattern is five in number, as shown in FIG. 3.
Figure 7:
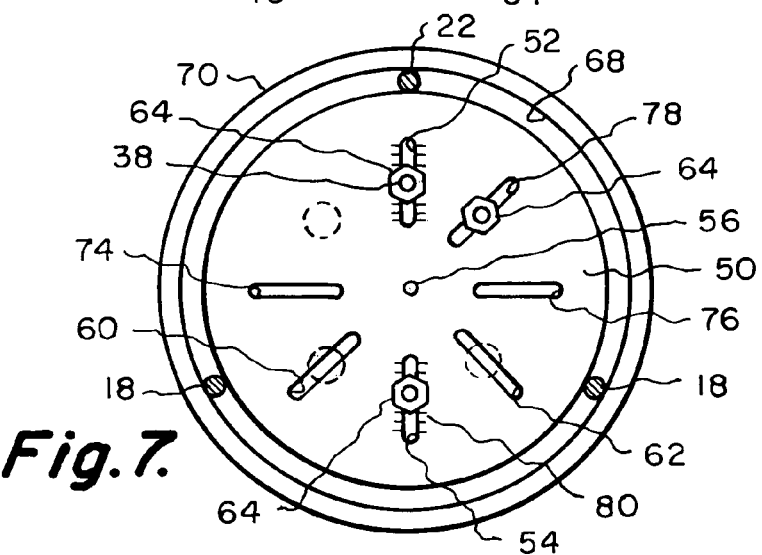
FIG. 7 is a view similar to FIG. 5 but where the lug bolt pattern is six in number.

The outer surface of the mounting plate 50 includes an annular groove 68. This annular groove 68 is located directly adjacent the peripheral edge 70 of the mounting plate 50. The fingers 18 and 22 are to be located in conjunction with the annular groove 68 which comprises an enlarged means. An appropriate mechanism included in conjunction with the alignment instrument 10 is then to be operated which will cause the fingers 18 and 22 to be forced outwardly against the outer edge of the annular groove 68 securely mounting the alignment instrument 10 onto the mounting plate 50. There is to be included in conjunction with the alignment instrument 10 a window 72 through which the center point 56 can be observed. This can function as a double check system to make sure that the alignment instrument 10 is centrally mounted relative to the mounting plate 50. The alignment instrument 10 can now be used in a conventional manner to align the position of the mounting plate 50, and since the mounting plate 50 is mounted precisely to the rotational plane of the tire 24, the user knows that when the mounting plate 50 is correctly aligned so also will be the vehicular wheel which comprises the tire 24. Within some vehicles, there are different lug bolt patterns other than the five lug bolt pattern shown in FIGS. 3 and 6. Included within the mounting plate 50 are a pair of horizontally oriented elongated holes 74 and 76 and an angularly located elongated hole 78. If the lug bolt pattern is either four or eight in number of lug bolts, three in number of the sleeves 48 can be substituted for three in number of the lug bolts, such as for example for holes 52 and 54 and for hole 74 although hole 76 could be used instead of hole 74. Holes 74 and 76 have their longitudinal dimension aligned with horizontal axis 75 which is perpendicular to axis 53. In any event, holes 52, 54, 74 and 76 are available for usage when the lug bolt pattern is either four or eight in number. As previously discussed, when there are five in number of lug bolts, the elongated holes 52, 60 and 62 are used. When there are six in number of lug bolts in a lug bolt pattern, which is shown in FIG. 7, elongated holes 52, 54 and 78 are utilized. Longitudinal dimension of hole 78 is located at a sixty degree angle from axis 53. Longitudinal dimension of hole 78 is substantially radial from center point 56. Providing a three point mounting using three of the sleeves 48 insures precise parallel mounting of the mounting plate 50 for all lug bolt patterns.

When observing of the disc 28, it can be seen that there is really no place for mounting of the alignment instrument 10 as there is no annular groove, such as groove 68. By utilizing of the mounting plate 50 of this invention, a convenient place for mounting of the alignment instrument 10 is provided.

Inscribed alongside of each of the elongated holes 52 and 54 are a series of graduation lines 80. The use of the graduation lines 80 adjacent a particular elongated hole 52, 54, 60, 62 and 78 may be used by the mechanic to facilitate central mounting of the mounting plate 50 relative to the disc 28. The graduation lines 80 are positioned so that there are the same number of lines to the inner side of each nut 64 which will then mean that the mounting plate 50 is centrally mounted and the nut 64 can then be tightened.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A mounting system adapted to mount an alignment instrument on a wheel hub assembly which is fixedly mounted on a wheel hub assembly by a series of spaced apart lug bolts that are arranged in a specific pattern that protrude outward from the vehicular wheel, the mounting system comprising:

a mounting plate, said mounting plate having a peripheral edge and an engagement means located directly adjacent said peripheral edge, said engagement means comprising an annular groove which includes a wall, the alignment instrument including fingers which are to be forced outwardly against said wall securely mounting by clamping the alignment instrument onto said mounting plate, spacing means for fixedly mounting said mounting plate in a spaced position from the vehicular wheel; and a fastener assembly secured to said spacing means, said fastener assembly for securely mounting said mounting plate on the vehicular wheel, said mounting plate having at least five in number of elongated holes located in a specific spaced apart arrangement, each said elongated hole to be able to connect with a lug bolt, there being at least two in number of the lug bolts each connecting with a said elongated hole.

2. The mounting system as defined in claim 1 wherein:

at least a pair of said elongated holes has inscribed alongside on said mounting plate a series of graduation lines which are to be used by a mechanic to centrally mount said mounting plate on the wheel hub assembly.

\* \* \* \* \*